I. Forman.
Culinary App's.
N° 89,303.  Patented Apr. 27, 1869.
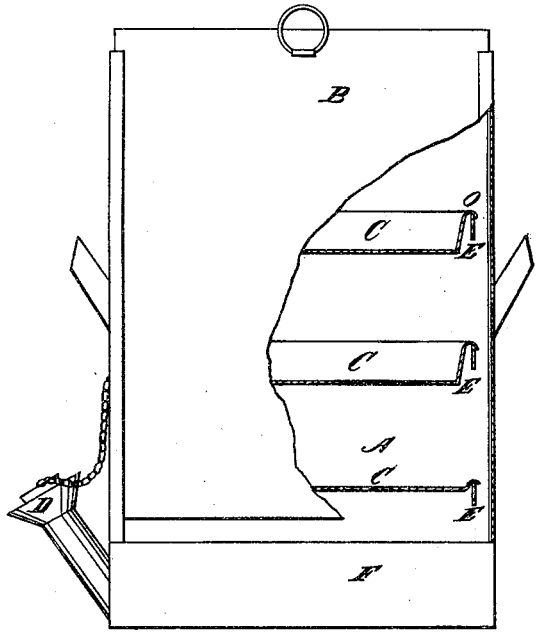
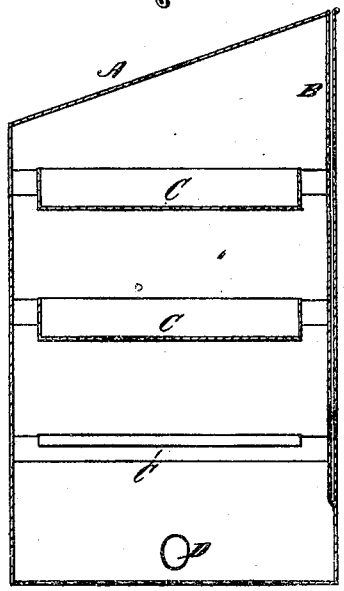
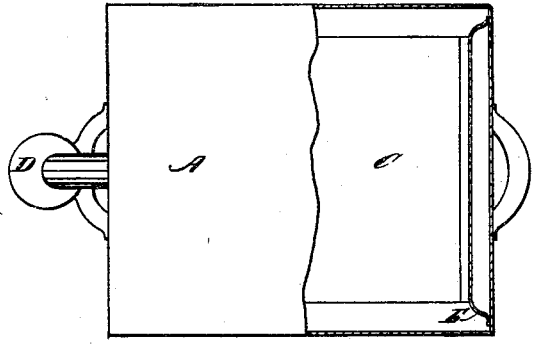
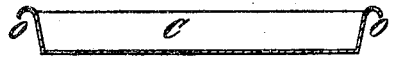
Witnesses:
James A. White.
John J. Moore.
Inventor
Israel Forman.

ISRAEL FORMAN, OF FAIRMONT, WEST VIRGINIA.

Letters Patent No. 89,303, dated April 27, 1869.

CULINARY-STEAMER.

The Schedule referred to in these Letters Patent and making part of the same.

*To all whom it may concern:*

Be it known that I, ISRAEL FORMAN, of Fairmont, in the county of Marion, and State of West Virginia, have made certain new and useful Improvements in Culinary-Steamers; and I do declare that the following is a full, clear, and exact description of the same, reference being had to the accompanying drawings, forming a part of this specification, in which—

Figure 1 is a front view of the steamer, having a portion of its sliding-door broken off, to show the pans or shelves as arranged within it.

Figure 2 is a vertical cross-section of fig. 1.

Figure 3 is a bottom view of the steamer, with a portion of its bottom broken off to show the open space between the pans and sides of the steamer, and also to show the form of the brackets, which support the pans or shelves in their places.

Figure 4 is a sectional view of one of the pans.

Similar letters of reference indicate corresponding parts in the several figures.

This steamer consists of a box or chest, to be used on a common cook-stove. It is made of sheet-metal, and has a movable sliding-door, and has a water-receptacle in its bottom, to hold water for the generation of steam, and is so constructed as to hold the edibles to be cooked on movable pans or shelves introduced within it.

Now, my improvement consists in constructing the brackets or ledges, for supporting pans, in such a manner as to leave an open space on all sides, for the free passage of steam, and in making a hooking-flange on the ends of the pans, to catch on said brackets, so that the pans are held firmly in their place, and at the same time may be conveniently removed.

To enable others skilled in the art to make and use my invention, I will proceed to describe its construction and operations.

In the drawings—

A is a box or chest of suitable size, made of sheet-metal, with a slanting top. As shown in fig. 2, its front side is closed by a movable sliding-door, B.

In the bottom of the box is a deep pan, F, to hold water for the generation of steam.

The box is furnished with movable pans, or shelves C C, for holding the edibles to be cooked, said pans being supported by brackets, or ledges E E, the ends only of which touch and are fastened to the side of the steamer, as shown at E, fig. 3, thus leaving an open space on all sides for the free passage of steam.

The pans or shelves are furnished with a hooking-flange on their ends, as shown at O, fig. 4, to catch on the brackets E E, as shown in fig. 1.

D, fig. 1, is a funnel-mouthed spout, furnished with a common cork, by means of which it may be opened or closed at pleasure, for the double purpose of either pouring water into or out of the steamer.

In cooking with this steamer it is set on a common cook-stove, and the bottom F is then filled with water, which is allowed to come to a boil, the articles to be cooked are then placed on the pans, or shelves C C, and the sliding-door B is then closed, and the water kept boiling until the edibles are sufficiently cooked.

Now, what I claim as my invention, and desire to secure by Letters Patent, is—

The bracket, or ledge E E in connection with the flange O, constructed substantially as and for the purpose set forth.

ISRAEL FORMAN.

Witnesses:
JAMES A. WHITE,
JOHN J. MOORE.